United States Patent

Castanier

[11] 4,039,205
[45] Aug. 2, 1977

[54] REAR-END SUSPENSION FOR AN AUTOMOTIVE VEHICLE

[75] Inventor: Emile Lucien Castanier, Conflans-St-Honorine, France

[73] Assignee: Chrysler France, Paris, France

[21] Appl. No.: 638,672

[22] Filed: Dec. 8, 1975

[30] Foreign Application Priority Data

Dec. 31, 1974 France .............................. 74.43493

[51] Int. Cl.² .............................................. B60G 9/00
[52] U.S. Cl. .................................................. 280/721
[58] Field of Search ............... 280/675, 674, 673, 616, 280/617, 721, 723, 725, 106 R, 106 T, 106.5 R; 267/63 R, 63 A, 57.1 R, 57.1 A, 67, 20, 15

[56] References Cited

U.S. PATENT DOCUMENTS

| 3,181,885 | 5/1965 | Baracos | 280/723 |
|---|---|---|---|
| 3,201,142 | 8/1965 | Dangauthier | 280/106.5 R |
| 3,333,865 | 8/1967 | Boehner | 280/721 |
| 3,580,593 | 5/1971 | Sprunger | 280/716 |

*Primary Examiner*—Joseph F. Peters, Jr.
*Assistant Examiner*—R. Schrecengost
*Attorney, Agent, or Firm*—Steinberg & Blake

[57] ABSTRACT

Rear-end suspension for an automotive vehicle comprising a rigid cross-member mounted by means of resilient bearing assemblies on the vehicle frame or body. At each side of the vehicle is provided a substantially triangular wheel arm pivoted at two vertices of the triangle to the cross-member, the third vertex carrying the spindle on which the wheel is mounted. In view to limit the longitudinal displacements of the ends of the cross-member, each of said ends is mounted on the vehicle frame by means of two directional bearing assemblies the directional axes of which intersect substantially on the axis of the cross-member.

8 Claims, 1 Drawing Figure

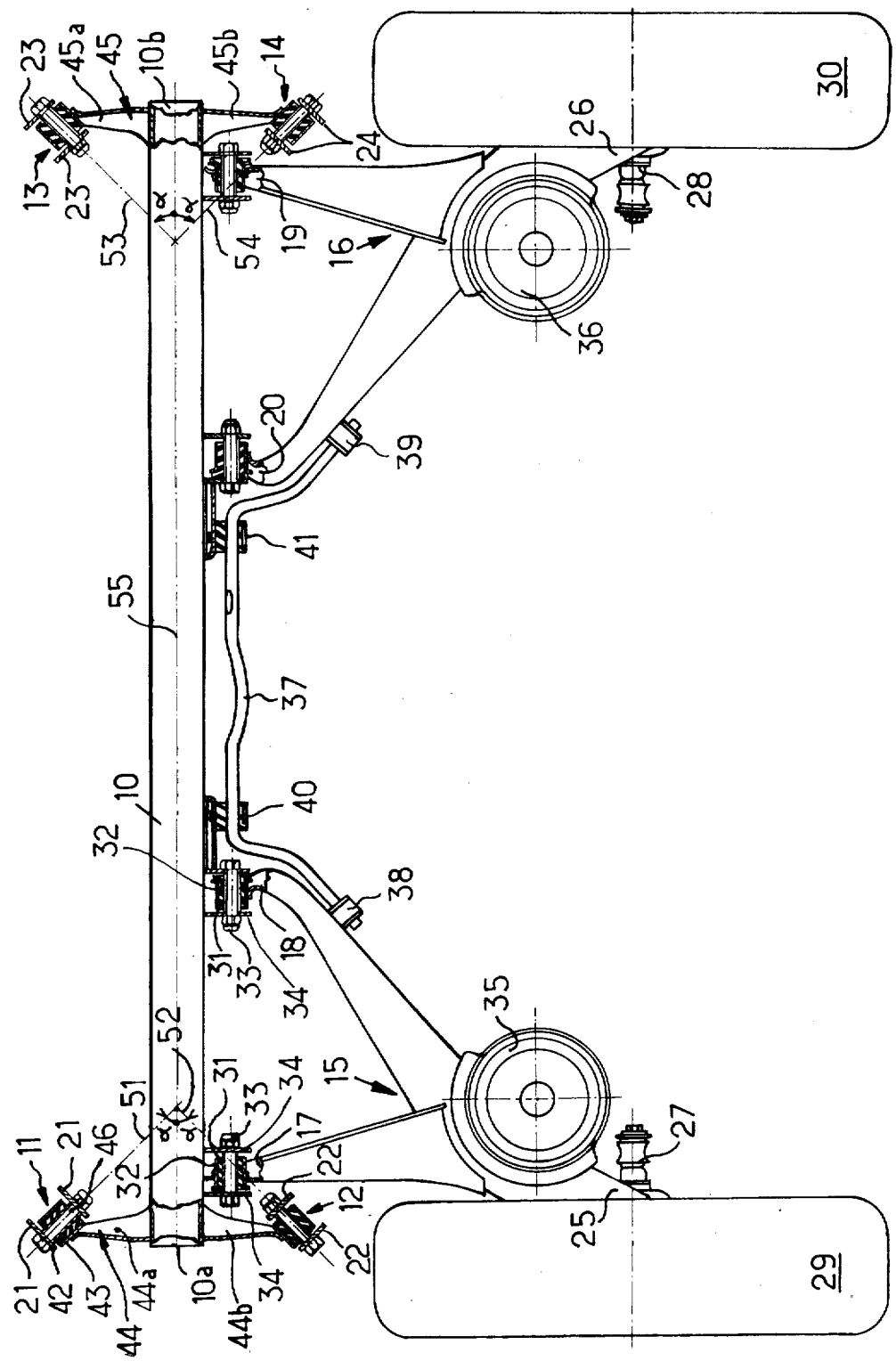

REAR-END SUSPENSION FOR AN AUTOMOTIVE VEHICLE

The present invention relates to a rear-end suspension for an automotive vehicle.

It is known that, in automotive vehicles, in particular those with front drive, the wheel arms are mounted by means of a resilient pivoting device on a cross-member of the vehicle frame, which is itself resiliently mounted at each of its ends on the side members of the said frame. Such an arrangement, although offering the advantage of very good absorption of vibrations, is on the other hand inconvenient in that it produces steering effects on the rear wheels owing to slight longitudinal displacements of the ends of the cross-member, which displacements are allowed by the resilient interconnecting members between the said cross-member and the said frame. Now such displacements are detrimental to the road holding qualities of the vehicle.

The invention allows the above-mentioned difficulties to be obviated by using a rear-end suspension of the type comprising a rigid cross-member mounted by means of resilient bearing assemblies on the vehicle frame or body, two substantially V-shaped wheel arms pivoted at two free ends to the cross-member, the vertex carrying the spindle for the wheel, and shock-absorbing and suspension means being provided between the said arms and the vehicle frame or body, the said suspension being characterized, according to the invention, in that the said cross-member is mounted at each of its ends on a support which is secured to the vehicle frame or body, through the medium of directional resilient bearing assemblies arranged at either side of the cross-member, allowing very slight movements or plays about an axis, the said axes of the said bearing assemblies being so directed as to mutually intersect substantially on the axis of the cross-member. Thus, the longitudinal displacements of the ends of the cross-member are prevented during operation, since the device just described produces a wedging effect tending to block or hinder the rotation of the cross-member in the horizontal plane whatever the direction of the efforts applied to the cross-member in that plane. Under such conditions, the resilient suspension of the cross-member absorbs the vibrations satisfactorily without introducing any unfavorable effects interfering with the road holding qualities of the vehicle.

The invention will appear more clearly from the following description with reference to the single appended drawing showing diagrammatically an elevational view of a rear-end suspension for an automotive vehicle according to the invention.

According to the form of embodiment illustrated in the drawing, the rear-end suspension for an automotive vehicle is of the type comprising a substantially rigid cross-member 10 mounted by means of resilient bearing means or assemblies 11, 12, 13, 14 on the vehicle frame or body (not shown). The connection with the frame is illustrated at each bearing assembly 11-14 by the supports 21, 22, 23, 24 forming part of the vehicle frame.

Two substantially V-shaped wheel or suspension arms 15, 16 are pivoted at their free ends 17, 18 and 19, 20 to the cross-member 10, the vertex 25, 26 carrying the spindle 27, 28 on which the wheel 29, 30 is mounted.

The suspension arms are pivoted at 17-20 to the cross-member 10 in a manner known per se by means of resilient bushings such as 31 interposed between the bearing 32 of the corresponding wheel arm and a pivot 33 mounted on supports 34 secured to the cross-member 10.

The suspension also comprises shock-absorbing and suspension means diagrammatized at 35, 36 between the arms 15, 16 and the vehicle frame or body (not shown).

Lastly, a stabilizer bar 37 of the torsion-bar type interconnects the two wheel arms 15, 16 by being assembled to the said arms at two points by means of resilient bearing assemblies 38, 39 and also at two points of the cross-member by means of resilient bearing assemblies 40, 41.

According to an essential feature of the invention, the cross-member 10 is secured to the vehicle frame or body through the medium of directional resilient bearing assemblies 11-14 arranged at either side of the cross-member, forwardly and rearwardly thereof, advantageously in symmetrical relationship. These bearing assemblies, of a type known per se, allow very slight movements or play about axes 51, 52, 53, 54 of the resilient bearing assemblies 11-14, respectively. The bearing assemblies are advantageously constituted as shown in the drawing, by resilient bushings such as the bushings 42 interposed between a bearing 43 fastened to a longitudinal support 44 secured at the end 10a of the cross-member, and a pivot 46 carried by the supports 21 fastened to and forming part of the vehicle frame or body. Thus, it is apparent that the longitudinal support 44 provides the cross-member 10 with a substantially T-shaped configuration at its end 10a.

At the other end 10b of the cross-member there is a symmetrical construction with another longitudinal support 45.

In the example of embodiment illustrated, the four resilient bearing assemblies 11, 12, 13, 14 are mounted in a similar manner at each end 44a, 44b, 45a, 45b of the supports 44, 45.

Furthermore, according to a preferred form of embodiment, the axes 51, 52, 53, 54 intersect the axis 55 of the cross-member at an angle $a$ comprised between 30° and 60° and preferably substantially equal to 45°. Under such conditions, the wedging effect mentioned above is maximum and the device thus tends to immediately prevent any tendency of the cross-member to rotate in the horizontal plane.

Of course the invention is by no means limited to the form of embodiment illustrated and described, which has been given by way of example only, the invention comprising all technical equivalents to the means described as well as their combinations, should the latter be carried out according to its gist and within the scope of the following claims.

What is claimed is:

1. Rear-end suspension for an automotive vehicle having a frame, comprising a rigid cross-member having an axis extending transversely of the vehicle, resilient bearing means on the vehicle frame, two wheel arms pivoted to and extending rearwardly from the cross-member, and each carrying distant from said cross-member a spindle on which a wheel is mounted, and shock-absorbing and suspension means being provided between the said arms and the vehicle frame, wherein said resilient bearing means includes for mounting said cross-member at each of its ends two directional resilient bearing assemblies each having a directional axis and arranged respectively forwardly and rearwardly of the cross-member, allowing very slight movements about the directonal axis of each bearing assembly, said axes of said bearing assemblies mutually intersecting substantially on the axis of the cross-member.

2. Rear-end suspension according to claim 1, wherein the said directional axes intersect the cross-member axis at an angle comprised between 30° and 60°.

3. Rear-end suspension according to claim 1, wherein the said directional axes intersect the cross-member axis at an angle of approximately 45°.

4. Rear-end suspension according to claim 1, wherein the said directional resilient bearing assemblies are arranged symmetrically at either side of the cross-member.

5. Rear-end suspension according to claim 1, wherein each bearing assembly comprises a pivot pin member, a bearing member, and a rubber bushing interposed therebetween, one of the latter members being secured to the cross-member and the other to the vehicle frame.

6. Rear-end suspension according to claim 1, wherein a stabilizer bar interconnects the two wheel arms by being resiliently assembled at two points on the cross-member and at one point on each arm.

7. Rear-end suspension according to claim 1 wherein said directional axes intersect said cross-member axis at points situated between the ends of said cross-member.

8. Rear-end suspension according to claim 1 and wherein said cross-member carries at each of its ends a longitudinal member extending transversely across the cross-member and providing it with a substantially T-shaped configuration at each end, and said longitudinal member having opposed ends each of which carries one of said directional resilient bearing assemblies.

* * * * *